US008103867B2

(12) United States Patent
Spitz

(10) Patent No.: US 8,103,867 B2
(45) Date of Patent: Jan. 24, 2012

(54) METHOD AND SYSTEM FOR OBTAINING DIGITAL SIGNATURES

(75) Inventor: Charles F. Spitz, Wellesley, MA (US)

(73) Assignee: Computer Associates Think, Inc., Islandia, NY (US)

(\*) Notice: Subject to any disclaimer, the term of this patent is extended or adjusted under 35 U.S.C. 154(b) by 1262 days.

(21) Appl. No.: 11/380,720

(22) Filed: Apr. 28, 2006

(65) Prior Publication Data

US 2006/0190734 A1    Aug. 24, 2006

Related U.S. Application Data

(63) Continuation of application No. 09/767,398, filed on Jan. 21, 2001, now Pat. No. 7,039,807.

(51) Int. Cl.
*H04L 29/06* (2006.01)

(52) U.S. Cl. ........ 713/150; 713/168; 713/176; 380/279; 380/282

(58) Field of Classification Search .......... 380/277–286; 713/168–181; 704/251
See application file for complete search history.

(56) References Cited

U.S. PATENT DOCUMENTS

| | | | |
|---|---|---|---|
| 4,868,877 A | 9/1989 | Fischer | |
| 4,965,763 A * | 10/1990 | Zamora | 704/1 |
| 5,005,200 A | 4/1991 | Fischer | |
| 5,214,702 A | 5/1993 | Fischer | |
| 5,315,504 A | 5/1994 | Lemble | 700/90 |
| 5,659,616 A | 8/1997 | Sudia | |
| 5,742,769 A | 4/1998 | Lee et al. | 709/206 |
| 5,774,552 A | 6/1998 | Grimmer | |
| 5,787,175 A | 7/1998 | Carter | 713/165 |
| 5,890,103 A * | 3/1999 | Carus | 704/9 |
| 5,912,972 A | 6/1999 | Barton | |
| 5,987,138 A | 11/1999 | Gilbert et al. | |
| 5,999,711 A | 12/1999 | Misra et al. | |
| 6,006,332 A | 12/1999 | Rabne et al. | |
| 6,021,491 A | 2/2000 | Renaud | |
| 6,039,248 A | 3/2000 | Park et al. | |
| 6,073,242 A * | 6/2000 | Hardy et al. | 726/1 |
| 6,314,425 B1 | 11/2001 | Serbinis et al. | 707/10 |

(Continued)

FOREIGN PATENT DOCUMENTS

EP    0387462    9/1990

(Continued)

OTHER PUBLICATIONS

"Audit-By-Receiver Paradigms for Verification of Authorization at Source of Electronic Documents" S. Russell, *Computers and Security*, vol. 13, No. 1, Feb. 1, 1994, pp. 59-67.

(Continued)

*Primary Examiner* — Edward Zee
*Assistant Examiner* — Chi Nguy
(74) *Attorney, Agent, or Firm* — Baker Botts L.L.P.

(57) ABSTRACT

A digital signature system includes a database holding access control rules that identify documents authorized users are allowed to have electronically signed and a signing system capable of receiving signature requests from a plurality of authorized users, each signature request including a document to be signed, wherein the signing system parses the document to be signed and compares information obtained thereby to the access control rules stored in the database to determine whether the authorized user is authorized to have the document signed, and wherein if it is determined that the authorized user is authorized to have the document signed, the signing system signs the document using authentication information unique to the signing system.

26 Claims, 11 Drawing Sheets

U.S. PATENT DOCUMENTS

| | | | |
|---|---|---|---|
| 6,408,330 B1 * | 6/2002 | DeLaHuerga | 709/217 |
| 6,671,805 B1 * | 12/2003 | Brown et al. | 713/176 |
| 6,826,690 B1 * | 11/2004 | Hind et al. | 713/186 |
| 7,039,805 B1 * | 5/2006 | Messing | 713/170 |
| 7,210,037 B2 * | 4/2007 | Samar | 713/176 |
| 7,237,114 B1 * | 6/2007 | Rosenberg | 713/176 |
| 2002/0078140 A1 | 6/2002 | Kelly et al. | 709/203 |

FOREIGN PATENT DOCUMENTS

| | | |
|---|---|---|
| WO | WO9602993 | 2/1996 |
| WO | W0057318 | 9/2000 |
| WO | WO0062220 | 10/2000 |

OTHER PUBLICATIONS

"A New Approach to the X.509 Framework: Allowing a Global Authentication Infrastructure Without a Global Trust Model" Mendes S., et al., Network and Distributed System Security 1995., Proceedings of The Symposium on San Diego CA., IEEE Computer Society, Feb. 16, 1995, pp. 172-189.

* cited by examiner

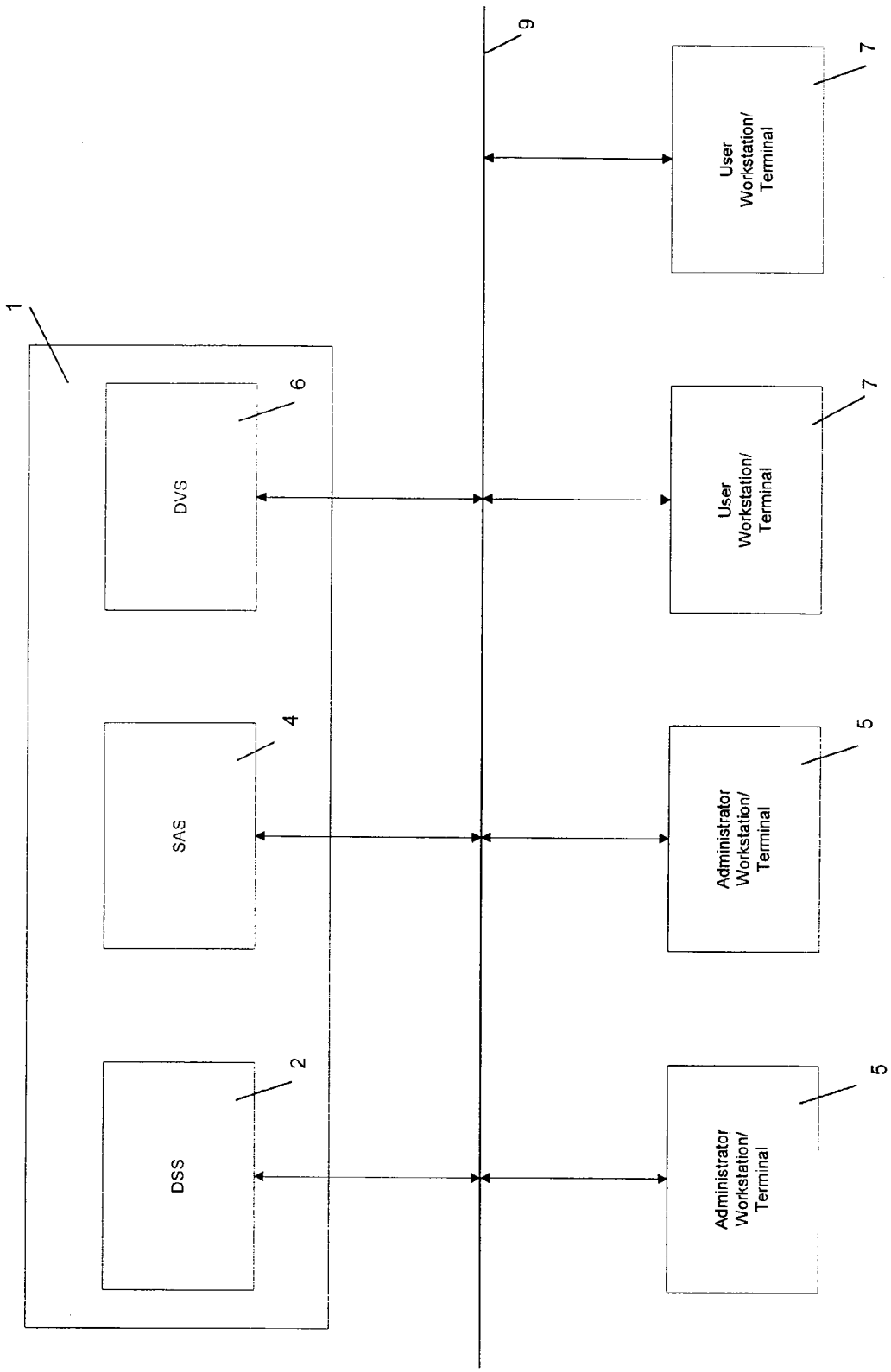

Figure 6

Purchasing Department

| Employee (Purchasing Officer) | Public Key | Authorization Limit | Purchase Type | Document Type |
|---|---|---|---|---|
| John Henrica | XXXX | $100,000 | Hardware | Contracts, Bids, Quotes |
| Abigail Jonsey | XXXX | $8,000 | Software | Contracts, Quotes |
| Frank Harvell | XXXX | $11,000 | Furniture | Contracts, Purchase Ord. |
| Daniel Catereen | XXXX | $50 | Bathroom Supplies | Bids |
| Pete Dilbean | XXXX | $100 | Kitchen Supplies | Bids |
| Peter Barresio | XXXX | $75 | Stationary Supplies | Bids |

Figure 7

Purchasing Department

| Employee (Purchasing Officer) | Email Address | Authorization Limit | Purchase Type | Document Types |
|---|---|---|---|---|
| John Henrica | XXXX | $100,000 | Hardware | Contracts, Bids, Quotes |
| Abigail Jonsey | XXXX | $8,000 | Software | Contracts, Quotes |
| Frank Harvell | XXXX | $11,000 | Furniture | Contracts, Purchase Ord. |
| Daniel Catereen | XXXX | $50 | Bathroom Supplies | Bids |
| Pete Dilbean | XXXX | $100 | Kitchen Supplies | Bids |
| Peter Barresio | XXXX | $75 | Stationary Supplies | Bids |

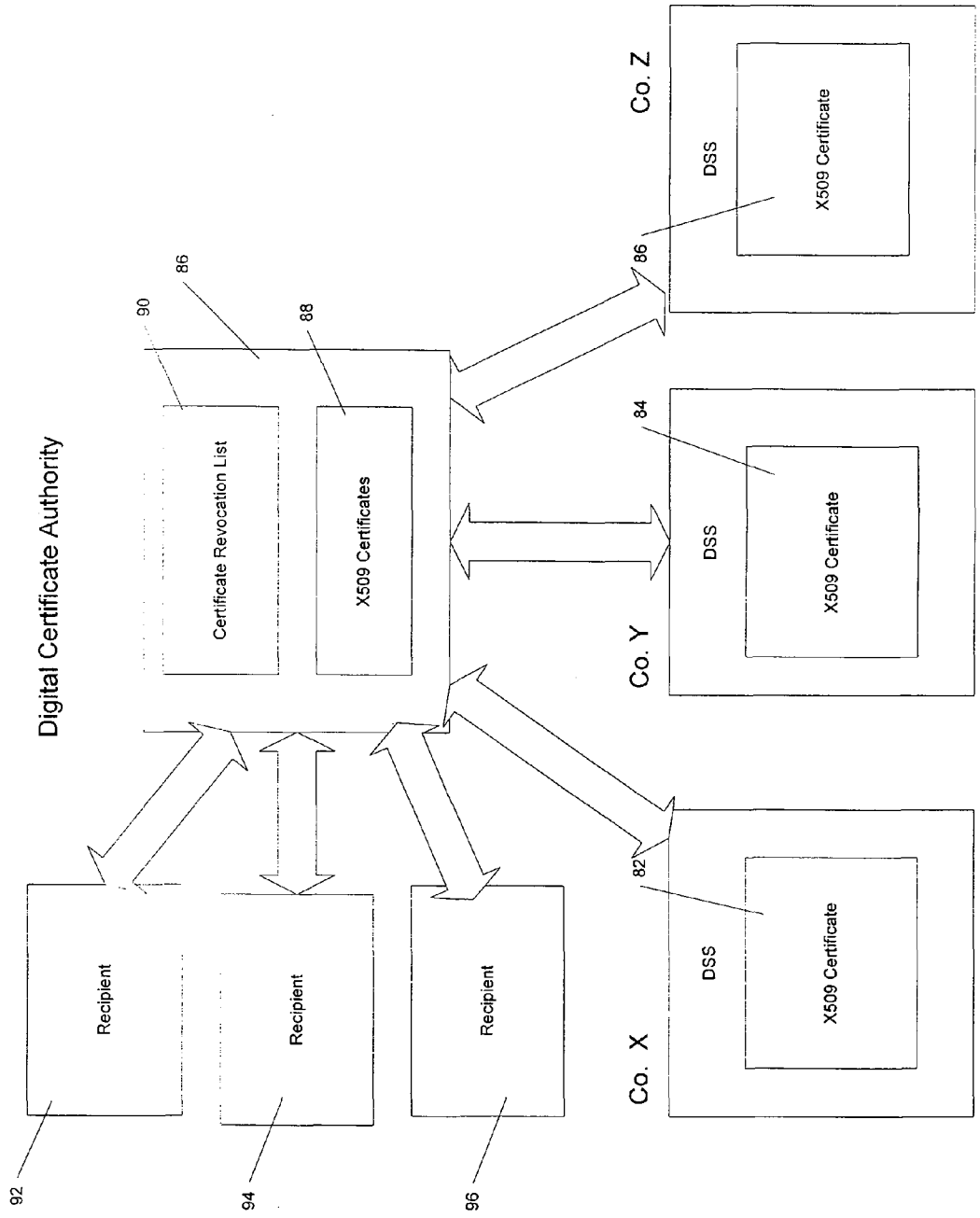

Figure 9

| Name | Action | Result | Reason | Date |
|---|---|---|---|---|
| Daniel Catereen | Validation Rqst | Denied | Unauth. Amt. | Aug. 15, 2000 |
| Abigail Jonesey | Validation Rqst. | Approved | | Aug. 15, 2000 |
| Peter Dilbean | Retrieve Doc. Info. | Denied | Certificate Revoked | Aug. 15, 2000 |
| Frank Harvell | Validation Rqst | Approved | | Aug. 15, 2000 |
| Unknown | Validation Rqst | Denied | Unauthorized User | Aug. 15, 2000 |
| Daniel Catereen | Validation Rqst | Approved | | Aug. 25, 2000 |

Figure 10

Date: Thurs, 30 Nov 2000   11:45:56

Message-ID: <YYYYYYYYYYYY@***.Co>

From: EmpRqstr@***.Co

To: DSS@***.Co

Subject: SIGNATURE REQUEST

Message:

Dear Sirs,

Please have the attached document signed and forwarded directly to the recipient at Recipient@*.Co**

Attachment:

DocToBeSigned.wpd

METHOD AND SYSTEM FOR OBTAINING DIGITAL SIGNATURES

CROSS-REFERENCES TO RELATED APPLICATIONS

This application is a continuation of U.S. Ser. No. 09/767,398 filed Jan. 21, 2001 now U.S. Pat. No. 7,039,807 which is incorporated by reference herein.

TECHNICAL FIELD OF THE INVENTION

The present disclosure relates generally to digital signatures, and in particular, to a method and system for obtaining digital signatures.

BACKGROUND OF THE INVENTION

Encryption is one of the most commonly utilized methods of securing the contents of data. Encryption is often used to secure data in transport and storage. In its basic form, encryption typically involves the use of algorithms for transforming plaintext data into an unintelligible form referred to as ciphertext. The algorithms used in encryption can be defined by the parameters used therein known as keys. Two well known encryption methods are symmetric methods using only private keys, and asymmetric methods which use public and private keys.

Using symmetric private key encryption, a sender encrypts data using a private key. The receiver then decrypts the data using the same private key. One deficiency of symmetric private key encryption is that both the sender and receiver must know the same private key. Thus, exchanging the key between sender and receiver can result in security risks including the risk of compromise or forgery of the private key.

Public key encryption is an asymmetrical encryption method involving the use of key pairs. Each key pair includes a public key and a private key. The holder of the private key can encrypt data using the private key. Only holders of the public key corresponding to the private key can decrypt the data using the public key. In turn, holders of the public key can encrypt data using the public key. The encrypted data can then be safely forwarded to the holder of the private key, since only the holder of the private key can decrypt the data. Typically, each user's public key is published in a public key file or embedded in a certificate. The user's private key can thus be kept secret.

Public key encryption provides increased security over private key encryption, since a holder's private key need not be revealed to anyone. Public key encryption also allows a recipient of data to prove the origin of the data. For example, the sender encrypts the data using their own secret private key. To validate the data, the recipient decrypts the data using the sender's public key. If the message is successfully decrypted using the sender's public key, the message must have originated from the sender, since only the sender has access to their private key.

In addition, digital signatures can provide a further level of protection. A sender can "sign" the data by encrypting it using their own private key. The sender can then package the signed data by further encrypting it using the recipient's public key. At the receiving end, the recipient decrypts the package using their own private key and then validates the sender's signature by further decryption using the sender's public key.

Digital signatures may also be formed using other methods. For example, data can be digested (hashed) into a single block using a one-way hash function. A one-way hash function has a property that it is computationally infeasible to construct any data that hashes to that value or to find data patterns that hash to the same digest. The digest can than be encrypted with the sender's private key. The resulting encrypted digest can then be appended to the encrypted or unencrypted data (encrypted using recipient's public key) as a signature. Upon receipt, the recipient decrypts the digest using the sender's public key. The recipient also digests (hashes) the data which was received unencrypted. If the data was received encrypted, it is first decrypted using the recipient's private key and then digested (hashed) using the same one-way hash function used by the sender. By checking the decrypted digest against the recipient generated digest, the senders's signature can be verified. This type of digital signature provides verification of the integrity of the data. That is, any modification of the data being sent will result in a different digest at the recipient's end and thus a comparison with the sender generated digest will provide an indicator that the data has been comprised. This type of digital signature also provides authentication of the origin of the data. For example, only the holder of the private key corresponding to the public key used to validate the digest could have signed the data.

To allow one user to identify another user for transmission of data in a manner that ensures the user's possession of a private key, the first user must be able to obtain the other user's public key from a trusted source. A Certification Authority (CA) provides such a trusted source. A CA issues public key certificates. Each certificate typically contains the user's name and public key, the issuing CA's name, a serial number and a validity period. The framework for public key certificates is defined in CCITT, "X.509: The Directory: Authentication Framework," April, 1993 ("X.509"), which is herein incorporated by reference. In effect, the public key certificates bind a user's name to the public key and are signed by a trusted issuer (e.g., the CA).

Typically the certificate is signed by an authority of the CA prior to distribution. Recipients of data from the user can trust the signature, provided that the recipient recognizes the authorities public key enabling verification of the CA authority's signature and to the extent the recipient trusts the CA.

One difficulty with the CA framework is that the certificates do not provide any indication of the degree of trust or the level of responsibility with which the sender of the message should be given. That is, the CA only certifies that the identified trusted authority (CA) recognized the sender's public key as belonging to that person.

Attribute certificates provide a further degree of protection. Attribute certificates certify a digital signature in a way which indicates the authority that has been granted to the party being certified. The attribute certificates include, in addition to information identifying the public key and the name of the party being certified, an authority level which is being granted and limitations and safeguards which are being imposed. This information may indicate issues of concern to the certificate. For example, the information may include a monetary limit for the certifee and/or the level of trust given to the certifee.

Typically, in a corporate or business environment, each employee is assigned their own digital certificate. Each employee can use their public key to sign any document they like. The receiver of the signed document is then required to verify that the signer's certificate has not been repudiated. This is typically accomplished by the recipient checking a certificate revocation list in the sender the company's directory. The recipient can also verify that the employee was authorized to sign the document by retrieving the employee's attribute certificates from the company's directory.

However, these traditional methods do have drawbacks. For example, the recipient whom often works for a different company than the signer, has the burden of checking the authorization level of the employee. This exposes potentially sensitive internal corporate information to anyone the organization sends a signed document. For example, to properly verify the senders authority, the recipient requires access to potentially sensitive corporate information regarding who has authority within the company to sign what.

Another limitation is that as employees leave a company, their certificates must be revoked. A certificate may be revoked by placing it on a certificate revocation list (CRL). The recipient of a document must then also check that the signer's certificate has not been revoked, adding an additional burden to the recipients duties and providing the recipient with additional potentially sensitive internal corporate information.

SUMMARY OF THE INVENTION

A digital signature system comprises a database holding access control rules that identify documents authorized users are allowed to have electronically signed and a signing system capable of receiving signature requests from a plurality of authorized users, each signature request including a document to be signed. The signing system parses the document to be signed and compares information obtained thereby to the access control rules stored in the database to determine whether the authorized user is authorized to have the document signed. If it is determined that the authorized user is authorized to have the document signed, the signing system signs the document using authentication information unique to the signing system.

The access control rules may identify at least one of a type and attribute of documents each user is authorized to have signed and the signing system may parse the document to be signed to determine at least one of a type and attribute of the document and compare the determined type and attribute of the document to the access control rules stored in the database to determine whether the user is authorized to have the document signed.

The request may further include user authentication information unique to the requesting user, wherein the signing system authenticates the user via the user authentication information and does not parse the document unless the user authenticates. The user authentication information may comprise a digital certificate, with corresponding public and private keys. The digital certificate may comprise an X-509 certificate.

The system may further comprise an email interface, wherein the signature request is in the form of an email from the user addressed to the signing system and the user authentication information may comprise a user's email address. The signing system may authenticate the user by comparing the user's email address to email addresses stored in the database.

A method of digitally signing documents using a signing system is also disclosed and comprises storing access control rules that identify documents authorized users are allowed to have electronically signed, receiving a signature request from at least one user, the signature request including a document to be signed and determining whether the user is authorized to have documents signed. If the user is authorized, the document to be signed is parsed.

Information obtained by the parsing is compared to the stored access control rules to determine whether the authorized user is authorized to have the attached document signed and if it is determined that the authorized user is authorized to have the attached document signed, the document is signed using authentication information unique to the signing system.

BRIEF DESCRIPTION OF THE DRAWINGS

A more complete appreciation of the present systems and methods and many of the attendant advantages thereof will be readily obtained as the same becomes better understood by reference to the following detailed description when considered in connection with the accompanying drawings, wherein:

FIG. 2A is a block diagram and FIG. 2B is a functional diagram of a signing system according to another embodiment;

FIG. 6 is a table for describing the types of information stored in a database according to an embodiment;

FIG. 7 is a table for describing the types of information stored in a database according to an embodiment:

FIG. 8 is a block diagram for describing a digital certification authority according to an embodiment;

FIG. 9 is a chart showing an audit log according to an embodiment; and

FIG. 10 is an example of an email used according to an embodiment.

DETAILED DESCRIPTION OF THE INVENTION

Figure 1:
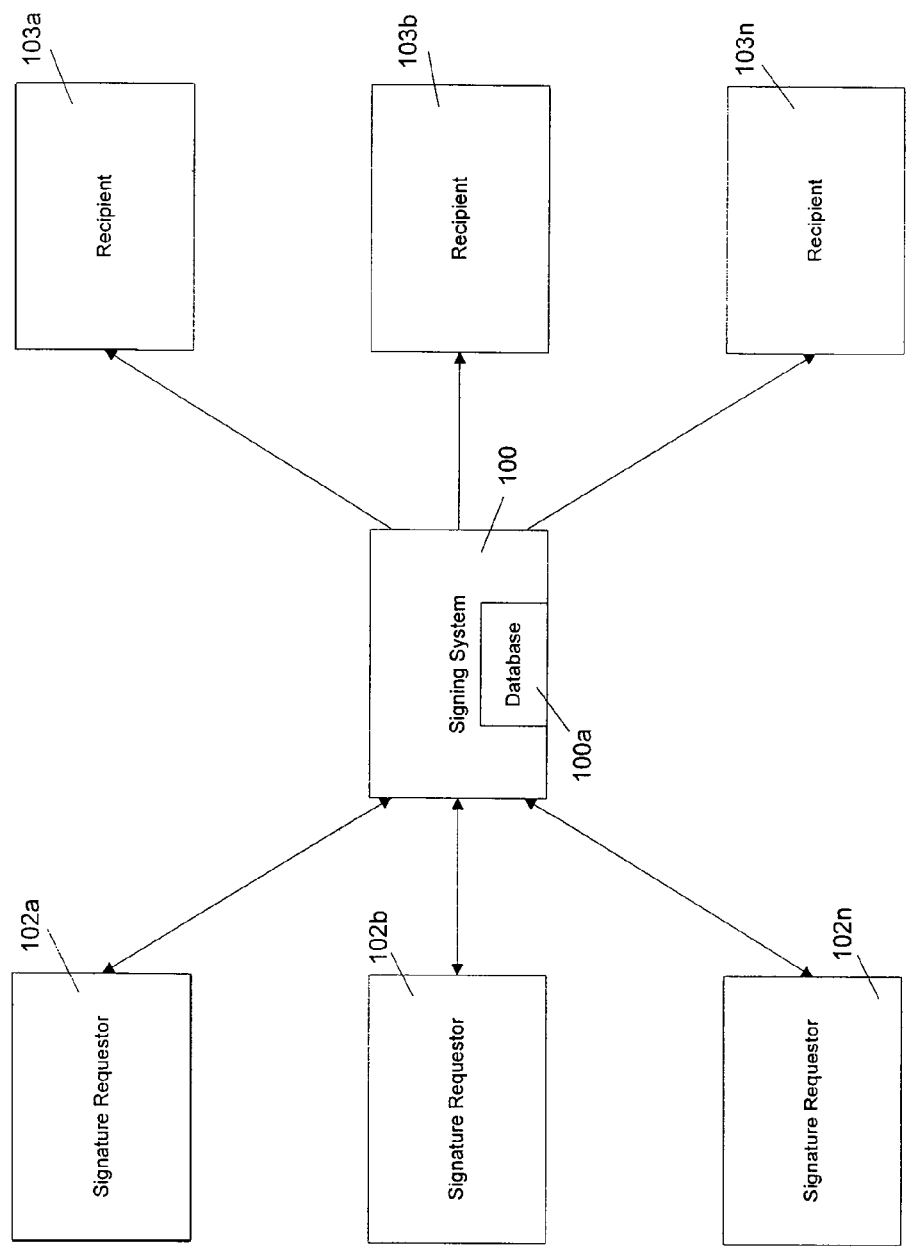
FIG. 1 is a block diagram of a signing system according to an embodiment.

In describing preferred embodiments illustrated in the drawings, specific terminology is 7 employed for sake of clarity. However, the present systems and methods are not intended to be limited to the specific terminology so selected and it is to be understood that each specific element includes all technical equivalents which operate in a similar manner.

A system for signing documents according to an embodiment is shown in FIG. 1. The system includes a signing system 100 for electronically signing documents using a certificate or private key uniquely associated with signing system 100, and a signing policy database 100a which stores information indicating the types and attributes of documents each authorized user is allowed to have signed. At least one signature requestor 102a-102n is authorized by signing system 100 to have specific documents signed by signing system 100. Each requester 102a-102n may submit a request to have any document they like signed. However, signing system 100 will only sign those documents that the requester is authorized to have signed. For example, a requestor will prepare a request to have a document signed and forward the request along with the document, to signing system 100. Signing system 100 will parse the document to determine its type and attributes.

Document parsing involves breaking a document into tokens or words, using lexical analysis and/or other techniques, for example, and then recognizing patterns of the tokens or words. For example, an XML document may be broken down into start tags, end tags, comments, elements, etc. An XML invoice, for example, may be characterized by a set of valid start and end tags, the attributes associated with the tags and constraints on the elements contained within the document. When parsing a document, the signing system will determine if a document is a valid XML document, for example. If a valid XML document, it will then determine if it is a valid XML invoice. The system identifies the attributes of the document (e.g., Total Amount=$1,000). The system may then compare this information with defined document types. For example, in this case, the invoice might be classified as an "Invoice Under $2,500". Of course, other document types may be used.

Signing system 100 then compares the document's type and attributes to the information stored in its database 100a to determine if the requestor is authorized to have the document signed. If the requestor is authorized to have the document signed, signing system 100 signs the document using its own unique signature certificate. The signed document is then forwarded to the intended recipient or recipients 103a-103n. The recipient(s) of the signed document then only have to verify that the signing system's signature certificate has not been revoked. Utilizing signing system 100, the onus of checking the authorization level of each signer can thus be maintained within the business or organization where it belongs. This lessens the work of the recipient of the signed document. In addition, internal corporate information is not needlessly exposed to outsiders and as employees leave the organization, there is no visible effect seen outside the company.

Figure 2B:
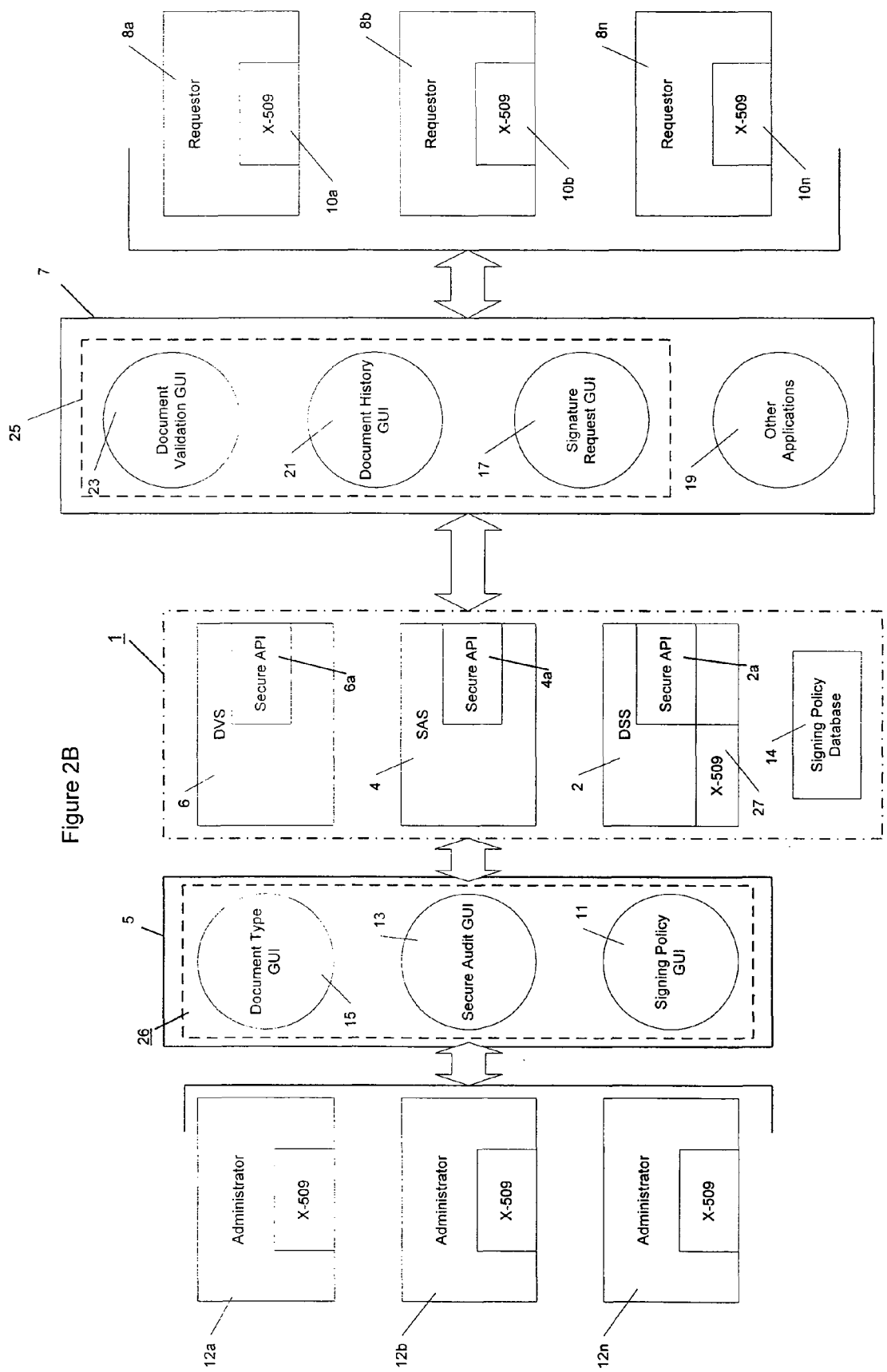

A more detailed explanation of a signing system according to an embodiment, will now be described by reference to FIGS. 2A and 2B. FIG. 2A shows the system in block diagram form and FIG. 2B shows the system in functional form. The signing system, according to this embodiment, includes a document signing server (DSS) 2, secure audit server (SAS) 4 and document validation server (DVS) 6. DSS 2, SAS 4 and DVS 6 are referred to collectively herein as signing system 1 and each is provided on a network 9, as shown in FIG. 2A. As shown in FIG. 2B, DSS 2. SAS 4 and DVS 6 each include a secure application program interface (API) which allows for secure communications between the servers and the requestors 8 and administrators 12.

Although network 9 is described as a local area network (LAN) in this embodiment, it will be appreciated that network 9 may instead be a wide area network (WAN) or other type of network such as the Internet, for example. To provide a further degree of security, servers 2-6 may be provided on a separate secure LAN which is connected to one or more LANs or the Internet via secure routers, for example. Also connected to network 9, are one or more administrator workstations or terminals 5 which allow administrators access to one or more of the servers 2-6. Although not shown, each server 2-6 may include a modem or other type of communication system for allowing remote access by authorized personnel. The network 9 may also have user workstations or terminals 7 connected thereto which allow employees or other authorized personnel (requestors) access to signing system 1 to request documents to be signed and/or to allow signed documents to be validated by signing system 1. Each workstation or terminal 5, 7 may consist of a personal computer (PC), for example. As shown in FIG. 2B, each user workstation or terminal 7 may include one or more graphical user interfaces (GUIs) 25 providing a user friendly interface between one or more requesters 8a-8n and signing system 1. In addition, other applications 19 running on workstation or terminals 7 may use the secure APIs to have documents signed, to validate signed documents and to track the history of signed documents. Each administrator workstation or terminal 5 may include one or more GUIs 26 providing a user friendly interface between one or more administrators 12a-12n and signing system 1.

A method and system for obtaining signatures according to this embodiment may be implemented in an organization wide environment so that all documents requiring a digital signature are signed by signing system 1. For example, a company can implement a policy so that the signing system 1 signs all documents requiring an electronic signature. In this embodiment, each requester 8a-8n represents an employee of company X. Of course, requesters can also include nonemployees authorized by company X to have corporate documents signed.

Signing system 1 includes a signing policy database 14 which defines the type and/or attributes of the documents that each authorized person is allowed to have signed. Each requester 8a-8n can request that signing system 1 sign any document they like. However, signing system 1 will only sign those documents which the requestor is authorized to have signed. For example, a requestor 8a can prepare a request for a document to be signed, using signature request GUI 17 at a terminal 7. The request, including the document to be signed, can then be packaged using the requestor's own certificate 10a and sent to DSS 2 via the secure API 2a. DSS 2 will parse the document to determine its type and attributes and may classify the document according to predefined company document type. DSS 2 will retrieve the types and attributes of documents that the requester is allowed to have signed. DSS 2 then compares the document's type and attributes to the database information. DSS 2 will only sign the document if the employee is authorized to have documents of that type and having those attributes signed. If requestor 8a is authorized to have the document signed, DSS 2 will sign the document using a single company wide certificate 27 which, in this embodiment, is an X-509 certificate. DSS 2 will then return the officially signed document to requester 8a. Requestor 8a can then forward the signed document to the recipient as is, or by further enclosing the signed document in an electronic envelope using the requestor's own certificate (e.g., X-509 certificate 10a). In the alternative, requestor 8a when preparing the request, can include the recipients email address, for example, and request that the signed document be delivered directly to the end recipient by DSS 2, after DSS 2 signs the document. DSS 2 can then forward the signed document directly to the recipient electronically via email, for example.

The recipient whom is typically, but not necessarily, an outsider to Company X, then only has to verify that the signing company's signature certificate 27 has not been revoked. This can be done, for example, via a certificate authority (CA). Typically, the signing system's certificate will only be revoked when the private key has been compromised. The recipient of the signed document then knows that the originator of the document was authorized by company X's signing policies to have the document signed, otherwise signing system 1 would not have signed the document.

Utilizing signing system 1, the onus of checking the authorization level of each signer is maintained within the business or organization where it belongs. This lessens the work of the recipient of the signed document. In addition, internal corporate information is not needlessly exposed to outsiders and as employees leave the organization, there is no visible effect seen outside the company.

As mentioned above, the system's signing policies are stored in signing policy database 14. As also mentioned above, the policies define, for example, whom is allowed to have particular types of documents signed. For example, the policies may limit the specific type of document (contract.

quote, bid, internal corporate document, etc.) that each requestor can have signed. The policies may also define document attributes for identifying the attributes of documents each requester is allowed to have signed. For example, the policies may set quote price limits or purchase price limits within the document that the requestor is allowed to have signed. Signing Policy GUI 11 allows one or more authorized administrators 12a-12n access to the system to define and modify the signing policies which are stored in signing policy database 14.

FIG. 6 depicts an example of the types of information that may be stored in database 14. As shown in this example, each employee has an authorization limit and a purchase type limit specifying limits on the attributes of the documents each requestor is allowed to have signed. Each requester is also limited to the type of document they are allowed to have signed (e.g., contract. quote, bid, etc.). Although FIG. 6 only depicts one department of Company X, database 14 may store information for each employee of the company authorized to sign documents, indicating the types and attributes of the documents they may have signed. In this example, each employee will only be allowed to have documents signed which have total purchase amounts less than their authorization limits and only for the particular types of items for which they are given authority to purchase. Each employee will also only be allowed to have a document signed, if it is of the type for which they are authorized. Of course, the signing policy database may include information identifying other document types and attributes.

Returning to FIG. 2B, document validation GUI 23 may be used by a requestor 8 to request signing system I to validate a signed document. That is, if a requestor 8 receives a signed document. the requester can forward the signed document to signing system 1 to have it validated. DVS 6 is responsible for validating signed documents in response to the request. DVS 6 will parse the document, determine the type and attributes of the document, determine whether the document has been signed and if so, whether the signature is valid. DVS 6 will construct a list of the attributes and their values found in the document and this information can then be returned to the requestor.

As will be described in more detail below, SAS 4 maintains logs of all transactions requested to be performed by DSS 2 and DVS 6. Requestors 8 may request information about signed documents from SAS 4 using document history GUI 21. For example, a requester may request the status of a signature request placed earlier, in order to determine if and when the signed document was sent to the recipient. SAS 4 is capable of reviewing and searching its logs in response to an authorized request and providing an appropriate response to the requester. For added security. the logs can be digitally signed and tamper-proof so that unauthorized parties do not have access thereto.

Figure 3:
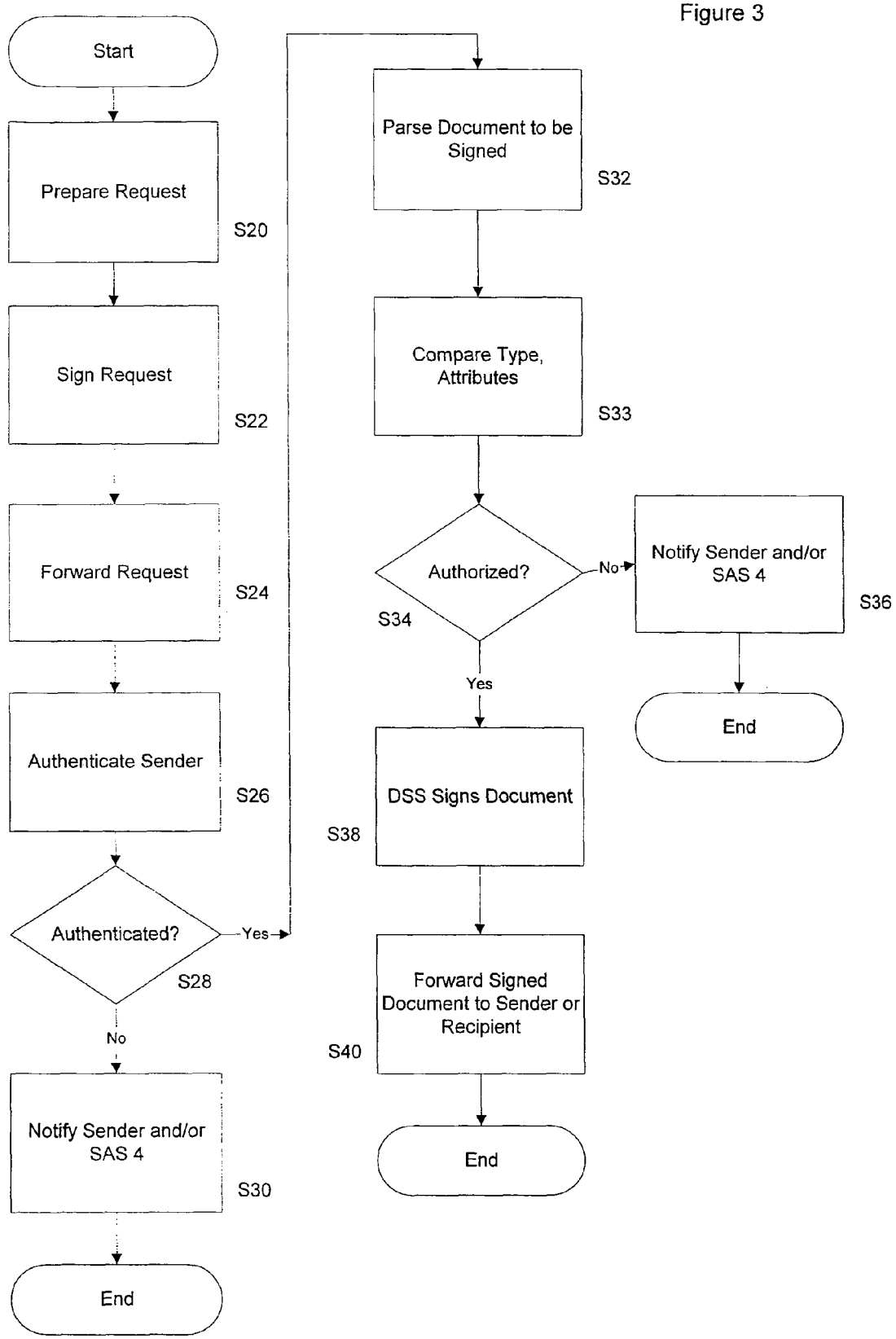
FIG. 3 is a flow chart for describing a method of providing digital signatures according to an embodiment.

Overall operation of an embodiment of signing system 1 will now be explained by reference to the flowchart shown in FIG. 3. Each employee (requestor) within an organization, for example, is given a digital certificate which is generated using any available public key infrastructure (PKI) system. For purposes of this embodiment, each employee is provided with an X-509 certificate. In step S20, a requestor 8a, for example, prepares a request to DSS 2 using signature request GUI 17. For example, signature request GUI 17 may prompt the requestor for specific input necessary to prepare the request. The request may, for example, be a request that a purchase order for a particular item at a particular cost be signed by DSS 2. The request will include a copy of the document (the purchase order) to be signed. The requestor then signs the request using their own certificate (Step S22) and forwards the signed request to DSS 2 (Step S24) via secure API 2a. Upon receipt, DSS 2 retrieves the requester's public key from database 14 and authenticates the request (Step S26). If the request does not authenticate (No, Step S28), notification is provided to the requestor that their request did not authenticate (Step S30) and the process ends. SAS 4 may also be notified at this time that the request did not authenticate, so that a log of the failed request can be maintained. If the request successfully authenticates (Yes, Step S28), DSS 2 parses the document to be signed to determine its type and attributes (Step S32). DSS 2 then compares the document's type and attributes to the authorization limits of the requester, as stored in database 14 (Step S33), to determine whether the requester is authorized to have the requested document signed. If the requestor is not authorized to have the document signed (No, Step S34), the requestor and/or SAS 4 are so notified (Step S32) and the procedure ends. If the requester is authorized (Yes, Step S34), DSS 2 signs the document using its own private signing key 27 (Step S38). The signed document is then returned to the requester or forwarded directly to the recipient (Step S40) depending on the request. SAS 4 may also be notified that the document was successfully signed. If the requestor requested that the signed document be returned to the requester, instead of directly to the end recipient, the signed document is returned to the requester. The requestor can then send the document to the end recipient as is. or can further package it (e.g., in an electronic envelope) using their private key and then forward the packaged document to the end recipient. Upon receipt, the end recipient opens the package using the sender's public key and authenticates the document with the DSS 2 public key, as will be further described below. On the other hand, if the signed document was sent directly from the signing system 1 to the recipient, the document may be authenticated using the DSS 2 public key.

Figure 4:
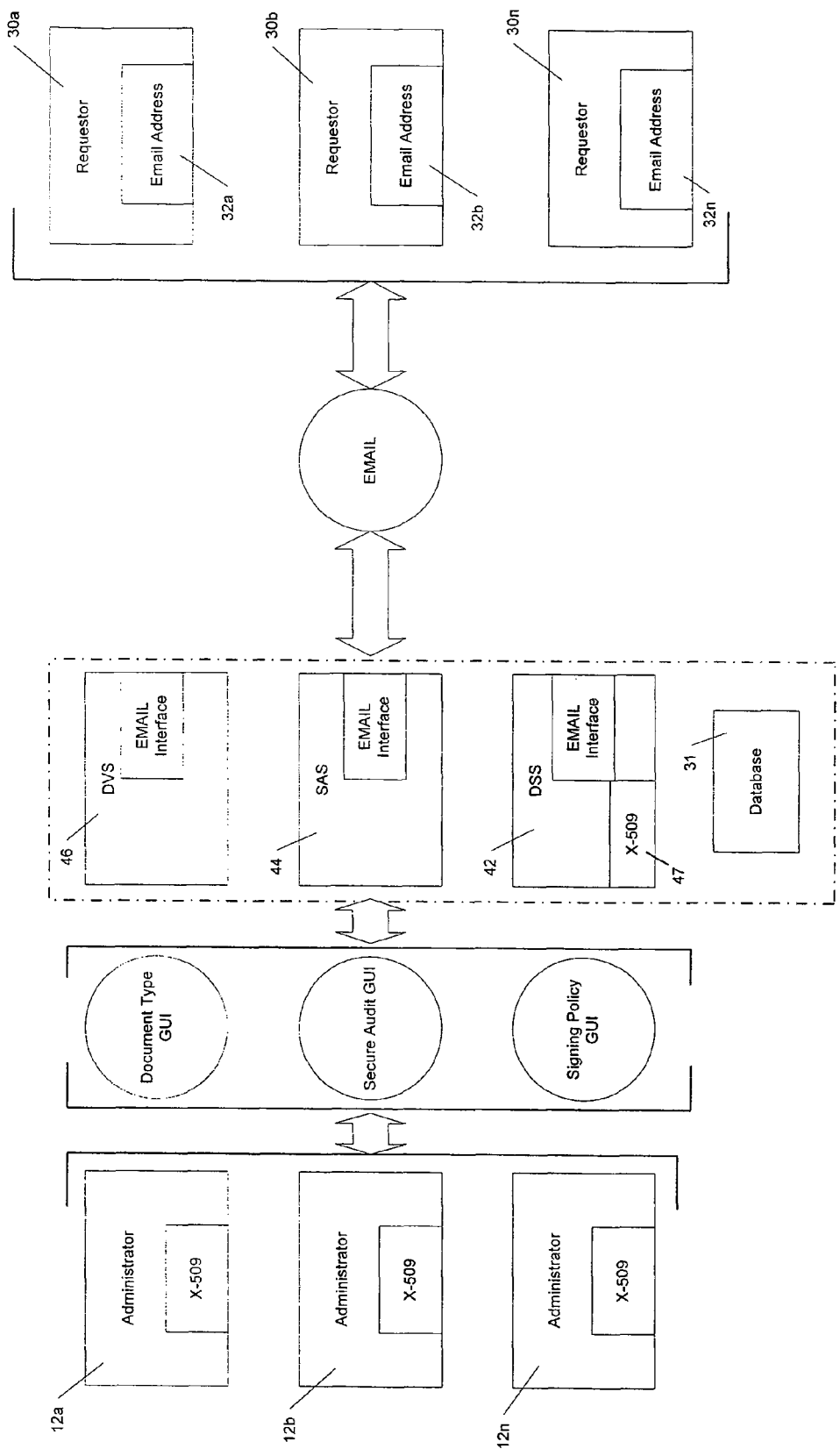
FIG. 4 is a functional diagram of a digital signature system according to another embodiment.

Employees (requesters) may also be identified and authenticated in other ways besides by use of certificates. For example, FIG. 4 depicts another embodiment in which each employee 30a-30n is identified and authenticated by their e-mail address (32a-32n). An employee prepares an email request such as that in FIG. 10. The email request includes a "DATE" field indicating the date that the email was sent by the employee. The email request also includes a "MESSAGE-ID" field which provides information for identifying the email. The "FROM" field is an email address uniquely associated with the employee sending the email request and can be used to identify the employee. The "TO" field is the email address of the DSS 42. The "SUBJECT" field is typically used to provide a quick identification of the subject matter in the email. According to this embodiment, the "SUBJECT" field of the email may include a predefined phrase such as "SIGNATURE REQUEST", for example, identifying this email as a signature request. A message field "MESSAGE" can be a message for providing additional information to DSS 42, including, for example, a request that the email be forwarded directly to the recipient after signing and providing the recipient's email address. In the alternative, the "MESSAGE" field may request that the signed document be returned to the employee requester. The document to be signed is attached to the email as a file attachment.

After receipt of the email, DSS 42 parses the "SUBJECT" field of the email, recognizes it as a signature request, and identifies the requester by their email address. DSS 42 also parses the "MESSAGE" field of the email request, determines that the signed document is to be forwarded directly to the recipient, and stores the recipient's email address for later reference. DSS 42 then downloads and parses the attached document. Using the signing policies stored in database 31, DSS 42 determines if the employee is authorized to have the requested document signed. If the employee is authorized, the DSS 42 signs the document using the system's private signing key 47. DSS 42 then prepares an email, attaching the signed document and forwards the signed document to the recipient at the recipient's email address. Of course, if the request was to return the signed document to the employee requestor, the signed document can be emailed back to the employee's email address as indicated in the "FROM" field of the request. The employee may also use e-mail to retrieve information about signed documents from SAS 44 and to validate signed documents via DVS 46.

Figure 5:
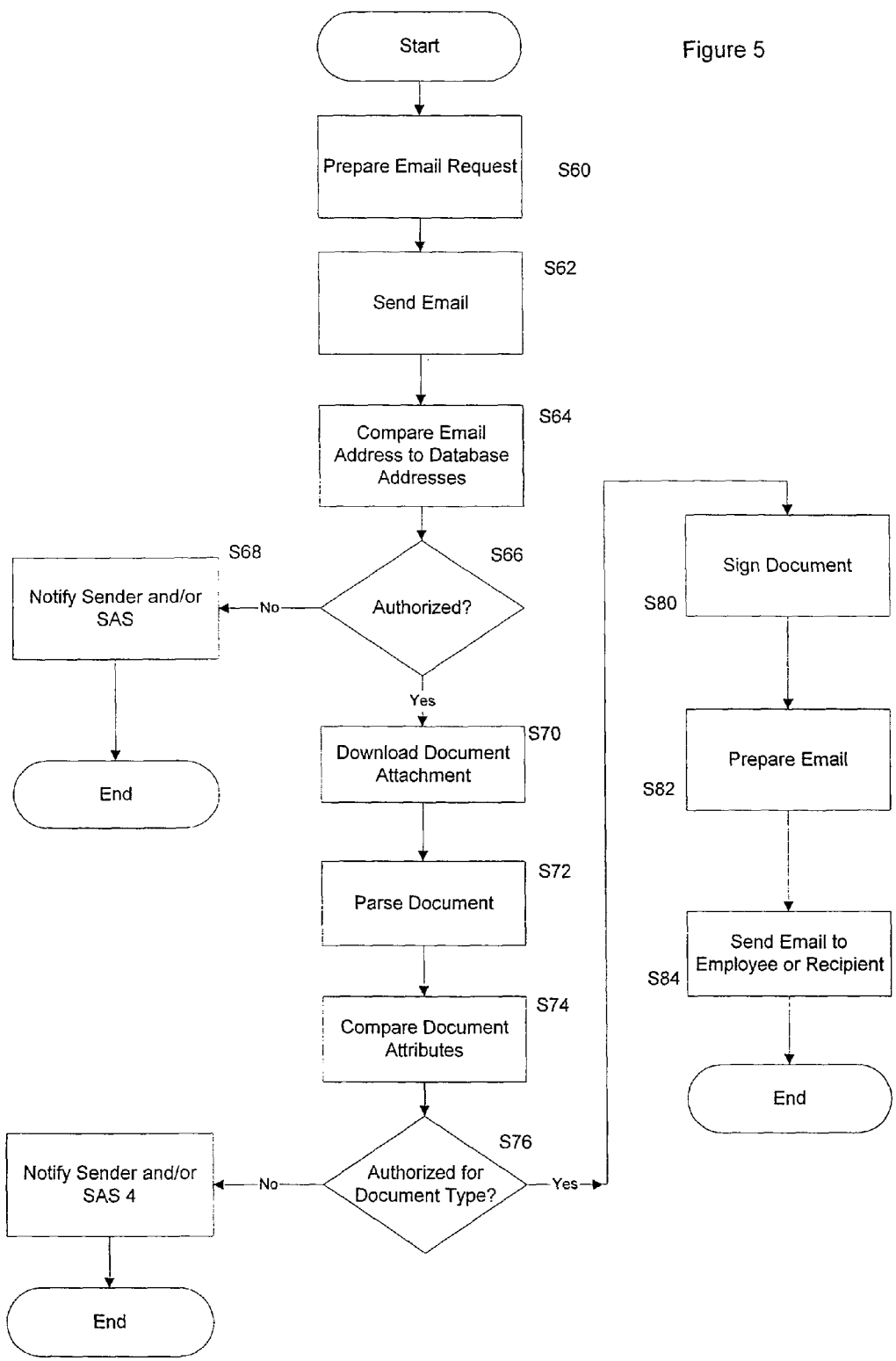
FIG. 5 is flow chart for describing a method of providing digital signatures according to the embodiment shown in FIG. 4.

FIG. 5 is a flowchart describing overall operation of the system shown in FIG. 4. In Step S60, an employee prepares an email requesting DSS 42 to sign a document. The email may include as an attachment, the document to be signed. The email is forwarded by the employee to DSS 42, by directing it to a unique email address associated with DSS 42 (Step S62). Upon receipt, DSS 42 compares the requestor's email address as shown in the "FROM" field of the email to its database of stored email addresses (Step S64) as stored in database 31. An example of the types of information stored in database 31 is shown in FIG. 7. The database includes the names and corresponding email addresses of each authorized employee as well as the type and attributes of the documents each employee is authorized to have signed. If the requestor's email address can not be matched to an employee in the database (No, Step S66), notification is returned to the requestor's e-mail address indicating, for example, that they are not authorized to use the system (Step S68). SAS 44 may also be notified that authorization was denied, logging the time of the request. the message-id of the email request, the email address of the requestor, etc. The process then ends. If the employee's email address is stored in the database, the employee is authorized to use the system to have documents signed (Yes, Step S66). DSS 42 downloads the document to be signed from the email attachment (Step S70). DSS 42 then parses the document to determine its type and attributes (Step S72). DSS 42 compares the document type and attributes to the authorized document type and attributes for the employee (Step S74) as retrieved from database 31 to determine if the employee is authorized to have the document signed. If the employee is not authorized to have the document signed (No, Step S76), the employee is notified (Step S78). Notification may also be provided to SAS 44. The process then ends. If the employee is authorized (Yes, Step S76), DSS 42 signs the document using its certificate (Step S80). DSS 42 can then prepare an e-mail to the employee or the recipient (Step S82) and e-mail the signed document back to the employee or the recipient (Step S84) depending on the request made. If returned to the employee, the employee is responsible for forwarding the officially signed document to the recipient.

Although shown above in separate embodiments, certificate authentication of the requestor as described with respect to FIGS. 2A and 2B and email authentication of the requestor as described with respect to FIG. 4 may be implemented in one system. In this way, the system can authenticate requestors via their certificate or their email address, depending on the type of system used to forward the request. For example, if an employee is away from the office and does not have access to a terminal including the appropriate GUIs, the employee may still have access to the system by email.

FIG. 8 depicts a system for providing digital certificates to organizations, companies etc. for use by their digital signing systems. Digital certification authority 86 acts as a certificate authority. Each company's X509 certificate (80, 82, 84) is stored in directory 88 of digital certificate authority 86. A certificate revocation list 90 is also provided at digital certificate authority 86. Each company X, Y and Z has a contract or agreement with digital certificate authority 86 obligating the company to honor their digitally signed documents. If the contract or agreement expires. or if the company's key has been compromised, the company's certificate is revoked and added to the certificate revocation list 90. A new certificate would then need to be issued to the company.

Upon receipt of a digitally signed document, the recipient contacts digital certificate authority 86. where the certificate revocation list 90 is checked to determine whether the sending company's certificate has been revoked. If not revoked, the recipient is provided with the company's public key, thus enabling the received document to be opened by the recipient. If the document was sent to the recipient sealed using the sending employee's own certificate also, the recipient obtains the sending employee's public key from either authority 86 or the appropriate authority that issued the employee's certificate. The recipient then unseals the signed document using the employee's public key and then contacts the digital certificate authority 86 to check the revocation list to determine if the company's DSS certificate 27 has been revoked and to obtain the company's public key. The recipient may then open the signed document.

Referring again to FIG. 2B, administrators 12 may each be provided with an X509 certificate. Each administrator is then authenticated using their X509 certificate when performing maintenance on the system, when performing an audit of the system, etc. A database (not shown) can be provided in signing system 1 which indicates the level of access each administrator has to areas of the system. For example, an administrator may be given access to the secure audit server 18, and be denied access to DVS 8 and DSS 2, while another administrator is given access to the entire system. In addition to the signing policy GUI 11, GUIs for use by the administrators may include a document type GUI 15. GUI 15 displays a list of predefined document classes (e.g., text, HTML, XML, CSV, etc.), each class having a number of defined attributes. An administrator 12 may create a document type by selecting a document class and specifying, the name of the document type. The attributes associated with the document class can be displayed, allowing the administrator to specify permissible values and/or ranges of values for particular attributes. The administrator may also specify whether particular attributes are allowed, required or prohibited in documents of the document type. After all information has been specified for the document type, the administrator can instruct signing system 1 to create the document type. The administrators may also use a secure audit GUI 13 which provides the administrators secure access to SAS 4.

As described above, all requests and results can be logged by SAS 4. The stored logs may contain, for example, the name of the party accessing the system, the type of action requested, the result of the request, the reason for denial of a request and the date of the request.

SAS 4 may also maintain an archive of all documents signed by the system. FIG. 9 shows an example of a portion of an audit log sheet which can be retrieved from SAS 4 by an administrator having proper authority. The audit log sheet can be compiled by the administrator by date, by requester name. by document ID or by document type, for example, and retrieved. The transaction log as shown in FIG. 9, may include the name of the party requesting an action, the action requested, the result, indicating whether the request was denied or approved, the reason for a denial and the date of the activity, for example. Of course, various other types of information may also be logged. For example, the requestor's department, the authorization amount/type requested, the email request Message-Id, etc. may be logged for periodic review or audit purposes.

It will be appreciated that although the above embodiments have been described as determining whether a requester is authorized to have a document signed by comparing authorized document types and attributes to those of the document to be signed, variations are possible. For example, it may be desirable to arrange the system so that employees are authorized to sign any type of documents having any attributes, except documents having of the type and having the attributes listed in the database in the document signing server. In other words, the database can be arranged to include documents which the requesters are not allowed to have signed.

The above-described systems may be conveniently implemented using one or more conventional general purpose digital computers and/or servers programmed according to the teachings of the present specification. Appropriate software coding can readily be prepared by skilled programmers based on the teachings of the present specification. The described systems may also he implemented by the preparation of application specific integrated circuits or by interconnecting an appropriate network of conventional component circuits.

Numerous additional modifications and variations of the described systems are possible in view of the above-teachings. It is therefore to be understood that within the scope of the appended claims, the present systems may be practiced other than as specifically described herein.

What is claimed is:

1. A method of digitally signing a document with a digital signature using at least one computer programmed to perform at least the following steps:
   receiving a signature request from a requestor, the signature request requesting that a document be signed;
   determining a type and at least one attribute associated with the document, wherein the type and at least one attribute are determined by:
      breaking the document into a plurality of smaller portions based on a document class associated with the document;
      applying lexical analysis to the plurality of smaller portions; and
      recognizing patterns of the smaller portions to determine the type and at least one attribute associated with the document;
   accessing one or more signing policies of an organization, the one or more signing policies identifying a plurality of authorized users of the organization, the one or more signing policies identifying one or more document types that an authorized user is authorized to sign;
   determining whether the requestor is an authorized user authorized to sign the document according to the one or more signing policies and the determined type and at least one attribute of the document; and
   signing the document with an organization digital signature generated using an organization private key associated with the organization, if the requestor is an authorized user authorized to sign the document.

2. The method of claim 1, wherein:
   accessing the one or more signing policies of the organization further comprises:
      accessing the one or more signing policies, the one or more signing policies identifying the one or more document types that an authorized user is authorized to sign by specifying one or more attributes of the one or more document types that the authorized user is authorized to sign; and
   determining whether the requestor is an authorized user authorized to sign the document according to the one or more signing policies further comprises:
      establishing one or more attributes of the document; and
      determining whether the one or more attributes of the document match the one or more attributes of the one or more document types that the authorized user is authorized to sign.

3. The method of claim 1, wherein receiving the signature request from the requestor further comprises:
   receiving the signature request, the signature request signed with a requestor digital signature generated using a requestor private key; and
   verifying the signature request using a requestor public key corresponding to the requestor private key.

4. The method of claim 1, further comprising:
   signing the signed document with a sender digital signature generated using a sender private key, the signed document configured to be verified with a sender public key corresponding to the sender private key.

5. The method of claim 1, wherein the signed document is configured to be verified using an organization public key corresponding to the organization private key.

6. The method of claim 1, wherein the organization private key is configured to be authenticated by a certificate authority.

7. The method of claim 1, further comprising:
   sending the signed document to a recipient, the recipient distinct from the plurality of authorized users.

8. The method of claim 1, wherein:
   the organization comprises a company; and
   the plurality of authorized users comprise a plurality of employees of the company.

9. A system for digitally signing a document with a digital signature, comprising:
   a database configured to:
      store one or more signing policies of an organization, the one or more signing policies identifying a plurality of authorized users of the organization, the one or more signing policies identifying one or more document types that an authorized user is authorized to sign; and
   a signing system in communication with the database and configured to:
      receive a signature request from a requestor, the signature request requesting that a document be signed;
      determine a type and at least one attribute associated with the document, wherein the type and at least one attribute are determined by:
         breaking the document into a plurality of smaller portions based on a document class associated with the document;
         applying lexical analysis to the plurality of smaller portions; and
         recognizing patterns of the smaller portions to determine the type and at least one attribute associated with the document;
      determine whether the requestor is an authorized user authorized to sign the document according to the one or more signing policies and the determined type and at least one attribute of the document; and
      sign the document with an organization digital signature generated using an organization private key associated with the organization, if the requestor is an authorized user authorized to sign the document.

10. The system of claim 9, the signing system further configured to:
   access the one or more signing policies of the organization by:
      accessing the one or more signing policies, the one or more signing policies identifying the one or more document types that an authorized user is authorized to sign by specifying one or more attributes of the one or more document types that the authorized user is authorized to sign; and
   determine whether the requestor is an authorized user authorized to sign the document according to the one or more signing policies by:
      establishing one or more attributes of the document; and
      determining whether the one or more attributes of the document match the one or more attributes of the one or more document types that the authorized user is authorized to sign.

11. The system of claim 9, the signing system further configured to receive the signature request from the requestor by:
   receiving the signature request, the signature request signed with a requestor digital signature generated using a requestor private key; and
   verifying the signature request using a requestor public key corresponding to the requestor private key.

12. The system of claim 9, the signing system further configured to:
   sign the signed document with a sender digital signature generated using a sender private key, the signed document configured to be verified with a sender public key corresponding to the sender private key.

13. The system of claim 9, wherein the signed document is configured to be verified using an organization public key corresponding to the organization private key.

14. The system of claim 9, wherein the organization private key is configured to be authenticated by a certificate authority.

15. The system of claim 9, the signing system further configured to:
   send the signed document to a recipient, the recipient distinct from the plurality of authorized users.

16. The system of claim 9, wherein:
   the organization comprises a company; and
   the plurality of authorized users comprise a plurality of employees of the company.

17. Software for digitally signing a document with a digital signature, the software stored in a non-transitory computer-readable medium and, when executed by a processor configured to:
   receive a signature request from a requestor, the signature request requesting that a document be signed;
   determine a type and at least one attribute associated with the document, wherein the type and at least one attribute are determined by:
      breaking the document into a plurality of smaller portions based on a document class associated with the document;
      applying lexical analysis to the plurality of smaller portions; and
      recognizing patterns of the smaller portions to determine the type and at least one attribute associated with the document;
   access one or more signing policies of an organization, the one or more signing policies identifying a plurality of authorized users of the organization, the one or more signing policies identifying one or more document types that an authorized user is authorized to sign;
   determine whether the requestor is an authorized user authorized to sign the document according to the one or more signing policies and the determined type and at least one attribute of the document; and
   sign the document with an organization digital signature generated using an organization private key associated with the organization, if the requestor is an authorized user authorized to sign the document.

18. The software of claim 17, further configured to:
   access the one or more signing policies of the organization by:
      accessing the one or more signing policies, the one or more signing policies identifying the one or more document types that an authorized user is authorized to sign by specifying one or more attributes of the one or more document types that the authorized user is authorized to sign; and
   determine whether the requestor is an authorized user authorized to sign the document according to the one or more signing policies by:
      establishing one or more attributes of the document; and
      determining whether the one or more attributes of the document match the one or more attributes of the one or more document types that the authorized user is authorized to sign.

19. The software of claim 17, further configured to receive the signature request from the requestor by:
   receiving the signature request, the signature request signed with a requestor digital signature generated using a requestor private key; and
   verifying the signature request using a requestor public key corresponding to the requestor private key.

20. The software of claim 17, further configured to:
   sign the signed document with a sender digital signature generated using a sender private key, the signed document configured to be verified with a sender public key corresponding to the sender private key.

21. The software of claim 17, wherein the signed document is configured to be verified using an organization public key corresponding to the organization private key.

22. The software of claim 17, wherein the organization private key is configured to be authenticated by a certificate authority.

23. The software of claim 17, further configured to:
   send the signed document to a recipient, the recipient distinct from the plurality of authorized users.

24. The software of claim 17, wherein:
   the organization comprises a company; and
   the plurality of authorized users comprise a plurality of employees of the company.

25. A method of digitally singing a document with a digital signature using at least one computer programmed to perform at least the following steps:
   receiving a signature request from a requestor, the signature request requesting that a document be signed, receiving the signature request from the requestor further comprising:
      receiving the signature request, the signature request signed with a requestor digital signature generated using a requestor private key; and
      verifying the signature request using a requestor public key corresponding to the requestor private key;
   determining a type and at least one attribute associated with the document, wherein the type and at least one attribute are determined by:

breaking the document into a plurality of smaller portions based on a document class associated with the document;

applying lexical analysis to the plurality of smaller portions; and recognizing patterns of the smaller portions to determine the type and at least one attribute associated with the document;

accessing one or more signing policies of an organization, the organization comprising a company, the one or more signing policies identifying a plurality of authorized users of the organization, the plurality of authorized users comprising a plurality of employees of the company, the one or more signing policies identifying one or more document types that an authorized user is authorized to sign, the one or more signing policies identifying the one or more document types that an authorized user is authorized to sign by specifying one or more attributes of the one or more document types that the authorized user is authorized to sign;

determining whether the requestor is an authorized user authorized to sign the document according to the one or more signing policies and the determined type and at least one attribute of the document by:

establishing one or more attributes of the document; and determining whether the one or more attributes of the document match the one or more attributes of the one or more document types that the authorized user is authorized to sign;

signing the document with an organization digital signature generated using an organization private key associated with the organization, if the requestor is an authorized user authorized to sign the document, the signed document configured to be verified using an organization public key corresponding to the organization private key, the organization private key configured to be authenticated by a certificate authority;

signing the signed document with a sender digital signature generated using a sender private key, the signed document configured to be verified with a sender public key corresponding to the sender private key; and sending the signed document to a recipient, the recipient distinct from the plurality of authorized users.

26. The method of claim 1, wherein:

the document class associated with the document is selected from the group consisting of a text document, an HTML document, an XML document, and a CSV document; and the type associated with the document is selected from the group consisting of a contract, a purchase order, a quote, an invoice, and a bid.

\* \* \* \* \*